United States Patent [19]
Ritz et al.

[11] Patent Number: 5,408,496
[45] Date of Patent: Apr. 18, 1995

[54] SPREAD-SPECTRUM, FREQUENCY-HOPPING RADIOTELEPHONE SYSTEM

[75] Inventors: Mordechai Ritz, Givat-Elah; Noam Livneh, D.N. Misgav; Giora Silbershatz, Haifa, all of Israel

[73] Assignee: Rafael Armament Development Authority, Israel

[21] Appl. No.: 80,075

[22] Filed: Jun. 18, 1993

[30] Foreign Application Priority Data

Nov. 3, 1992 [IL] Israel .................... 103620

[51] Int. Cl.[6] .......................... H04L 27/30
[52] U.S. Cl. .................... 375/202; 380/34; 455/33.1; 455/33.4; 455/53.1; 455/54.1; 379/58; 379/59
[58] Field of Search ............... 455/33.1, 33.4, 53.1, 455/54.1; 379/58, 59

[56] References Cited

U.S. PATENT DOCUMENTS

| | | | |
|---|---|---|---|
| 4,479,226 | 10/1984 | Prabhu et al. | 380/34 |
| 4,554,668 | 11/1985 | Deman et al. | 375/1 |
| 5,179,569 | 1/1993 | Sawyer | 375/1 |
| 5,193,101 | 3/1993 | McDonald et al. | 375/1 |
| 5,291,475 | 3/1994 | Bruckert | 375/1 X |

*Primary Examiner*—Bernarr E. Gregory
*Attorney, Agent, or Firm*—Corbrin, Gittes & Samuel

[57] ABSTRACT

A multiple access communications system reuses a set of N carrier frequencies in adjacent communications sites to provide more than N minimally cross-correlated frequency-hopping communications channels. A first set of communications channels is associated with a first of the communications sites. No two of the channels in the first set employ the same frequency at the same time. A second set of communications channels is associated with a second of the adjacent communications sites. No two of the channels in the second set of channels employ the same one of the N carrier frequencies at the same time. One or more sets of the minimally cross-correlated channels are further defined so that none of the channels in such sets employ the same frequency at the same time as more than a predetermined number of the channels in another of the sets of the minimally cross-correlated frequency-hopping communications channels.

15 Claims, 10 Drawing Sheets

SET 1 (SITE 1)

| CH1 | 1 | 2 | 3 | 4 | 5 |
|-----|---|---|---|---|---|
| CH2 | 2 | 3 | 4 | 5 | 1 |
| CH3 | 3 | 4 | 5 | 1 | 2 |
| CH4 | 4 | 5 | 1 | 2 | 3 |
| CH5 | 5 | 1 | 2 | 3 | 4 |

TIME t ⟶

FIG. 3A

SET 2 (SITE 2)

| CH1 | 4 | 3 | 2 | 1 | 5 |
|-----|---|---|---|---|---|
| CH2 | 3 | 2 | 1 | 5 | 4 |
| CH3 | 2 | 1 | 5 | 4 | 3 |
| CH4 | 1 | 5 | 4 | 3 | 2 |
| CH5 | 5 | 4 | 3 | 2 | 1 |

FIG. 3B

SET 3 (SITE 3)

| CH1 | 3 | 1 | 4 | 2 | 5 |
|-----|---|---|---|---|---|
| CH2 | 1 | 4 | 2 | 5 | 3 |
| CH3 | 4 | 2 | 5 | 3 | 1 |
| CH4 | 2 | 5 | 3 | 1 | 4 |
| CH5 | 5 | 3 | 1 | 4 | 2 |

SFH : 1 HOP FOR EVERY N CHANNEL SYMBOL

SPREAD-SPECTRUM, FREQUENCY-HOPPING RADIOTELEPHONE SYSTEM

BACKGROUND OF THE INVENTION

This invention relates generally to radiotelephone systems, and, more particularly, relates to methods and apparatus for implementing spread-spectrum, frequency-hopping techniques in a radiotelephone communications system for use in special mobile radio (SMR).

A plurality of communications channels may be defined in a given bandwidth of the radio frequency spectrum to provide a radiotelephone system by assigning a plurality of distinct carrier frequencies in the bandwidth to define each channel. Such systems are called frequency-division multiple access (FDMA) systems. Alternatively, the communications channels may be defined by assigning discrete time slots for using a given carrier frequency. Such systems are called time division multiple access (TDMA) systems. In a still different system the channels may be defined by what is known as code division multiple access (CDMA).

One type of communications system that can be a CDMA system is a spread spectrum system. Spread spectrum communications systems can be implemented as multiple access systems in a number of different configurations. One type of multiple access spread spectrum system is a code division multiple access (CDMA) system. CDMA spread spectrum systems may use direct sequence (DS-CDMA) or frequency hoping (FH-CDMA) spectrum spreading techniques. FH-CDMA systems can be further divided into slow frequency hopping (SFH-CDMA) and fast frequency hopping (FFH-CDMA) systems. In SFH-CDMA systems, several data symbols, representing a sequence of data bits that are to be transmitted, modulate the carrier frequency within a single hop. In FFH-CDMA systems, in contrast, the carrier frequency hops (changes) several times per data symbol.

FH-CDMA techniques have been proposed for cellular radiotelephone systems by Cooper and Nettleton. DS-CDMA was proposed in the context of cellular systems by Gilhousen et al.

There is increased channel capacity in a CDMA system over an FDMA system. The reason is that even though both types of systems are interference limited, the capacity of a FDMA system is determined by the largest interference that may exist in the bandwidth, whereas the capacity of a CDMA system is determined by the average interference over the entire bandwidth. Such average interference is usually much smaller than the worst case interference, unless the interference is the same in all parts of the bandwidth. Additionally, CDMA systems inherently incorporate frequency diversity, which mitigates multipath effects. Further, because of the interference averaging ability of the CDMA system, the employment of Voice Activity Detection and Discontinued Transmissions (VAD) techniques increases the capacity by reducing the average interference level by the duty ratio of the speech. By utilizing appropriate parameters, both DS-CDMA and FH-CDMA can provide similar averaging capabilities.

A further advantage of FH-CDMA systems is that the bandwidth employed need not be contiguous.

Frequency hopping and direct sequence techniques have been proposed and utilized in a number of spread-spectrum radio-telephone systems. Examples of such systems are set forth in the following:

U.S. Pat. No. 3,239,761 Goode
U.S. Pat. No. 5,048,057 Saleh et al
U.S. Pat. No. 4,066,964 Costanza et al
U.S. Pat. No. 4,176,316 DeRosa et al
U.S. Pat. No. 4,554,668 Deman et al
U.S. Pat. No. 4,979,170 Gilhousen et al
U.S. Pat. No. 5,099,495 Mikoshiba et al
U.S. Pat. No. 4,901,307 Gilhousen et al
U.S. Pat. No. 5,051,998 Murai et al
U.S. Pat. No. 4,222,115 Cooper et al
U.S. Pat. No. 4,704,734 Menich et al
U.S. Pat. No. 4,933,954 Petry
U.S. Pat. No. 5,010,553 Scheller et al
U.S. Pat. No. 5,065,449 Gordon et al
U.S. Pat. No. 5,067,173 Gordon et al
U.S. Pat. No. 4,144,411 Frenkiel
U.S. Pat. No. 4,794,635 Hess
U.S. Pat. No. 5,056,109 Gilhousen et al
EP 391,597
UK 2,242,806
WO91/13502
WO91/15071
WO91/12681
WO91/12681
U.K. Patent Application 2,242,806
U.K. Patent Application 2,242,805

Cooper et al, "A SPREAD SPECTRUM TECHNIQUE FOR HIGH CAPACITY MOBIL COMMUNICATIONS". 1978, IEEE Viterbi, "NON LINEAR ESTIMATION OF PSK-MODULATED CARRIER PHASE WITH APPLICATION TO BURST DIGITAL TRANSMISSION". 1982, IEEE Omura et al, "CODED ERROR PROBABILITY EVALUATION FOR ANTIJAM COMMUNICATION SYSTEMS". 1982, IEEE Lempel et al, "FAMILIES OF SEQUENCES WITH OPTIMAL HAMMING CORRELATION PROPERTIES". 1973, IEEE Verhulst et al, "SLOW FREQUENCY HOPPING MULTIPLE ACCESS FOR DIGITAL CELLULAR RADIO TELEPHONE". 1984, IEEE Mathematics which can be used for achieving orthogonality in a FH-CDMA system was suggested by H. Greenberger in an article "Families of Sequences with Optimal Hamming Correlation Properties" published in IEEE Transactions on Information Theory, Vol. IT 20, No. 1 January 1974.

U.S. Pat. No. 4,850,036 to Smith is directed to a dialing and synchronization sequence for a frequency hopping radiotelephone communication system. This patent teaches a system in which all frequency hopping channels are defined by using a sequence of carrier frequencies within a bandwidth such that no one carrier frequency is used by more than one channel at the same time. In this system, fewer frequency hopping channels can be attained in a given bandwidth than would be provided if each carrier frequency defined a separate channel.

U.S. Pat. No. 4,554,668 to Deman et al. discloses a frequency hopping radio communications system in which a master station is used to communicate digitally with a plurality of slave stations. Each slave station has a fixed carrier frequency sequence, permanently assigned to it, to define its communications channel. Timing information is extracted from the data stream.

UK patent application GB 242 805 A of Ramsdale et. al. discloses that interference can be reduced if a cell is sectorized into a group of smaller cells by means of a directional antenna; and also discloses that for reasons of interference reduction, adjacent microcells normally used different channels, as determined by a channel allocation scheme. However, when movement of a handset is detected (such as by marginally BER, low field strength or delay measurements), then a common "umbrella" channel is allocated to that handset in all of the microcells within a group of adjacent of nearby cells, that is a sub-array of the array.

U.S. Pat. No. 4,901,307 to Gilhousen indicates that in order to obtain a large number of users they use forward error correcting coded communication signals using code division multiple access (CDMA) spread spectrum transmission, and discloses the use of different size cells. This patent also discloses beam steering with a directional antenna to reduce interference in a CDMA spread spectrum radio telephone system, and a phase array antenna.

Application WO 92/00639 discloses that information communicated on the cellular-to-mobile link channels are encoded, interleaved, bi-phase (BPSK) modulated with orthogonal covering of each BPSK symbol along with quadrature phase shift key (QPSK) spreading of the covered symbols.

An article entitled *Slow Frequency Hopping Multiple Access for Digital Cellular Radiotelephone* by Verhulst et. al, published in IEEE Journal on Selected Areas in Communications, Vol. Sac-2, No. 4, July 1984, page 563, discloses that one drawback of frequency hopping multiple access is a reduction of spectrum efficiency, but that if power control and silence detection are used, good capacity can be attained.

U.S. Pat. No. 4,144,411 to Frenkiel discloses the use of different cell sizes in a mobile communications system.

PCT application WO 91/15071 discloses the use of a multiplicity of cells referred to as clusters.

U.S. Pat. No. 4,704,734 discloses a Method and Apparatus for Signal Strength Measurement and Antenna Selection in Cellular Radio Telephone Systems.

PCT application WO 91/12681 discloses an Interconnecting and Processing System for Facilitating Frequency Hopping.

PCT application WO 91/13502 discloses a system utilizing Shared-Carrier Frequency-Hopping.

U.S. Pat. No. 5,056,109 discloses a power control system that acts in response to power in the communications signal received and signals that are generated at the remote station that are transmitted back.

U.S. Pat. No. 5,048,057 to Saleh et al. discloses a Wireless Local Area Network utilizing codes exhibiting built-in diversity, and the use of side information by the decoder to improve its ability to accurately recover data in the presence of interference. This patent also mentions soft decision decoding.

PCT patent application number WO 92/00639 discloses a system with path diversity for a local area wireless telephone system.

Conventional spread-spectrum frequency hopping communications systems exemplified by the above-listed patents and publications, however, have a number of deficiencies. In particular, in some such systems, in order to define channels with minimum interference, the number of usable communications channels defined is less than the number of discrete, carrier frequencies used. This is characteristic, for example, of the system set forth in the Smith patent listed above.

It is an object of this invention to provide a frequency hopping spread spectrum radiotelephone system for use in SMR systems.

It is accordingly an object of the invention to provide improved radiotelephone communication methods and apparatus.

It is another object of the invention to provide a radiotelephone communication system wherein the number of discrete, usable communications channels exceeds the number of assigned carrier frequencies.

It is a further object of the invention to provide a radio-telephone communications system such that interference is more evenly distributed among the communications channels to provide more quality communications channels.

Other general and specific objects of the invention will in part be obvious and will in part appear hereinafter.

SUMMARY OF THE INVENTION

The foregoing objects are attained by the invention, which in one aspect provides a multiple access communications system in which a set of N carrier frequencies are reused in adjacent communications sites to provide greater than N minimally cross correlated frequency hopping communications channels. The system includes apparatus for defining a first set of minimally cross correlated frequency hopping communications channels associated with a first of the communications sites in which no two of the channels in the first set of the minimally cross correlated frequency hopping communications channels employ the same one of the N carrier frequencies at the same time and apparatus for defining a second set of the minimally cross correlated frequency hopping communications channels associated with a second of the adjacent communications sites in which no two of the channels in the second set of the minimally cross correlated frequency hopping communications channels employ the same one of the N carrier frequencies at the same time.

In a further aspect of this invention the system also includes apparatus for defining a third set of the minimally cross correlated frequency hopping communications channels associated with a third of the adjacent communications sites in which no two of the channels in the third set of the minimally cross correlated frequency hopping communications channels employ the same one of the N carrier frequencies at the same time.

In accordance with a still further aspect of this invention one or more sets of the minimally cross correlated channels are further defined so that no one of the channels in such set or sets of the minimally cross correlated frequency hopping communications channels employ the same one of the N carrier frequencies at the same time as more than a predetermined number of the channels in another of the sets of the minimally cross correlated frequency hopping communications channels, where the predetermined number is the minimum number of channels possible. In the preferred embodiment the predetermined number is one.

Yet another aspect of this invention is that the second and third sets of the minimally cross correlated frequency hopping communications channels are decimated transformations of each of the minimally cross correlated frequency hopping communications channels in the first set.

Each of the minimally cross correlated frequency hopping communications channels in the first set is defined by a unique sequence of the frequencies and the decimating transformation is performed on each of the minimally cross correlated frequency hopping communications channels in the first set by selecting frequencies from each of the minimally cross correlated frequency hopping communications channels in the first set in their sequential order skipping a first decimation number of frequencies in the sequence and repeating this process on the remaining frequencies in the sequence of each channel in their remaining order until all of the frequencies in each channel are used to define a second set of minimally cross correlated frequency hopping communications channels and a second decimating transformation is performed on each of the minimally cross correlated frequency hopping communications channels in the first set by selecting frequencies from each of the minimally cross correlated frequency hopping communications channels in the first set in their sequential order skipping a second decimation number of frequencies in the sequence and repeating this process on the remaining frequencies in the sequence of each channel in their remaining order until all of the frequencies in each channel are used to define a third set of minimally cross correlated frequency hopping communications channels, wherein the first and second decimation numbers are different and each is less than the minimum factor of N.

In a yet further aspect of this invention the system also includes apparatus for selectively encoding digital information signals on certain of the minimally cross correlated frequency hopping communications channels so that there is a redundant relationship between channel bits. The error correcting code sets this relationship and the decoder utilizes it for error correction.

In the preferred embodiment of this invention soft decision making and side information are employed in decoding. Voice activity detection is also employed to measure signal activity levels for selectively allocating channels to subscribers. Apparatus is also provided for performing a conference call between a plurality of subscribers in a site by causing each of the subscribers to employ the same channel. Additional subscribers can be included in such conference call in other sites by using the same approach and other conventional conferencing methods can be used to add parties using other telephone systems.

The invention further contemplates an electronically controlled antenna, apparatus responsive to a control signal for controlling the antenna to provide a first antenna radiation pattern for defining the first of the adjacent communications sites, apparatus responsive to a control signal for controlling the antenna to provide a second antenna radiation pattern which overlaps with the first antenna radiation pattern at a boundary for defining the second of the adjacent communications sites; and apparatus responsive to the number of the system subscribers using each of the first and second of the adjacent communications sites for affecting the control signal to move the boundary.

The invention also contemplates apparatus for defining a first micro-site within one or more of the adjacent communications sites, the first micro-site also reusing the N frequencies. The micro-site has no greater than 10% the average power as the adjacent communications site it is in.

The present invention contemplates the option of direct communication between subscribers if they are both in the micro-site by causing one of the two subscribers to communicate uplink with a first downlink channel and downlink with an first uplink channel, and causing the other of the two subscribers to communicate uplink on the first uplink channel and downlink on the first downlink channel.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

System Overview

Figure 1:
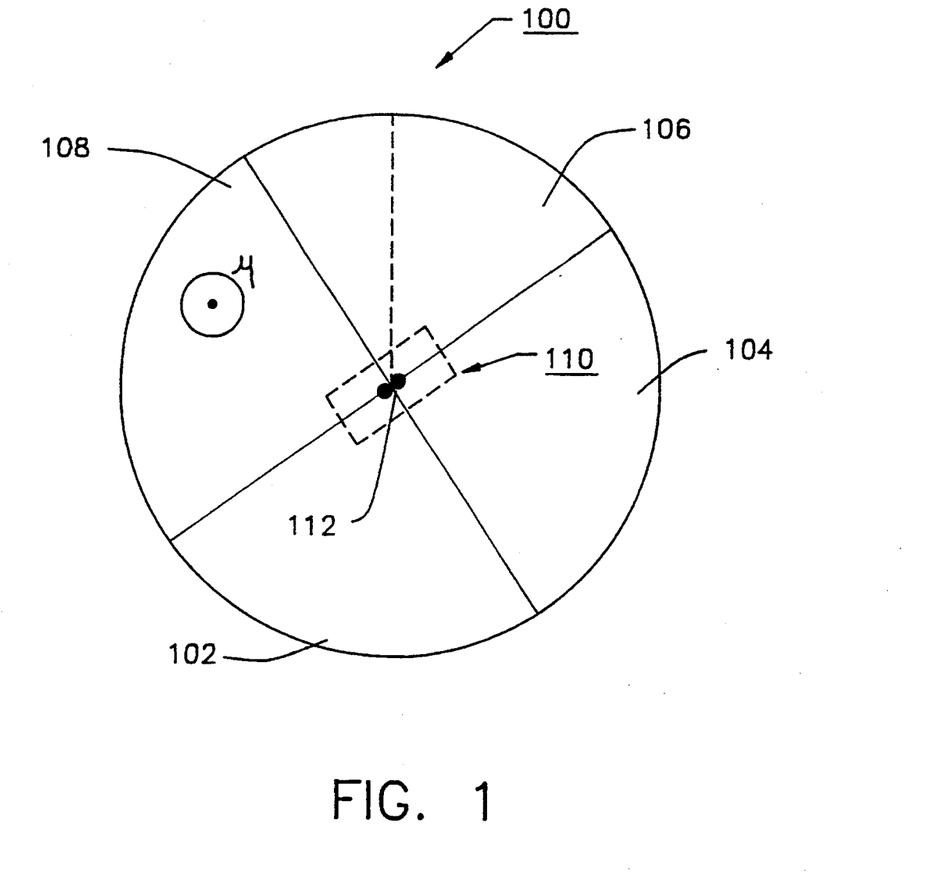
FIG. 1 is a schematic diagram depicting a first plurality of communications sites operating in accordance with the mobile communications system of the invention particularly suited for SMR systems.

FIG. 1 is a schematic diagram depicting a first plurality of communications sites operating in accordance with the mobile communications system of the invention.

Referring to FIG. 1, a geographic service coverage area scheme is shown. The geographic area of coverage 100 is divided into a plurality of communications sites 102, 104, 106, 108 which are each served by a central base communications station 110 having a sectorized antenna 112. Of course as in most real systems there is not perfect geographic isolation between the various sectors. One sector of the sectorized antenna 112 defines each of the sites 102, 104, 106, and 108.

A set of N carrier frequencies are reused in adjacent communications sites to provide greater than N minimally cross correlated frequency hopping communications channels. This result is attained by defining a first set of minimally cross correlated frequency hopping communications channels associated with the first of the communications sites 102 such that no two of the channels in the first set of the minimally cross correlated frequency hopping communications channels employ the same one of the N carrier frequencies at the same time. Apparatus and methods for defining the first set of communications channels is discussed in greater detail hereinafter in connection with FIGS. 3 and 4. As used herein, the term channel refers to either a single voice channel or one which can be further subdivided into subchannels through known ways such as time division multiplexing.

A second set of the minimally cross correlated frequency hopping communications channels associated with the second of the adjacent communications sites 104 is defined such that no two of the channels in the second set of the minimally cross correlated frequency hopping communications channels employ the same one of the N carrier frequencies at the same time. Apparatus and methods for defining the second set of communications channels is discussed in greater detail hereinafter.

Moreover, a third set of the minimally cross correlated frequency hopping communications channels associated with the third of the adjacent communications sites 106 is defined such that no two of the channels in the third set of the minimally cross correlated frequency hopping communications channels employ the same one of the N carrier frequencies at the same time. Apparatus and methods for defining the third set of communications channels is discussed in greater detail hereinafter.

In a preferred embodiment of the invention, at least one set of the minimally cross correlated channels is defined so that no one of the channels in such set or sets of the minimally cross correlated frequency hopping communications channels employ the same one of the N carrier frequencies at the same time as more than a predetermined number of the channels in another of the sets of the minimally cross correlated frequency hopping communications channels. This predetermined number of channels is the minimum number of channels possible. In the preferred embodiment the predetermined number is one. This property is discussed in greater detail hereinafter in connection with FIGS. 3A, 3B, 3C, and 4.

Conventional CDMA systems can operate only under a multi-cell frequency reuse pattern, which is required to control interference. This may cause serious frequency management problems, particularly when cells are added to an existing cellular system. On the other hand, the CDMA system described herein can implement a one cell frequency reuse pattern—i.e., the same frequencies can be reused in every communications site—thus mitigating the frequency planning problem that hampers current cellular systems. Furthermore, a cell may be divided into more than one communication site, as depicted in FIG. 1, which can be an important source for capacity increase. For example, by dividing each omni-cell into four communications sites, as indicated in FIG. 1, each using the same N carrier frequencies, significant additional channel capacity can be attained in the geographic area served, as compared with a system that does not have the same frequency reuse pattern.

Cellular Configuration

Figure 2:
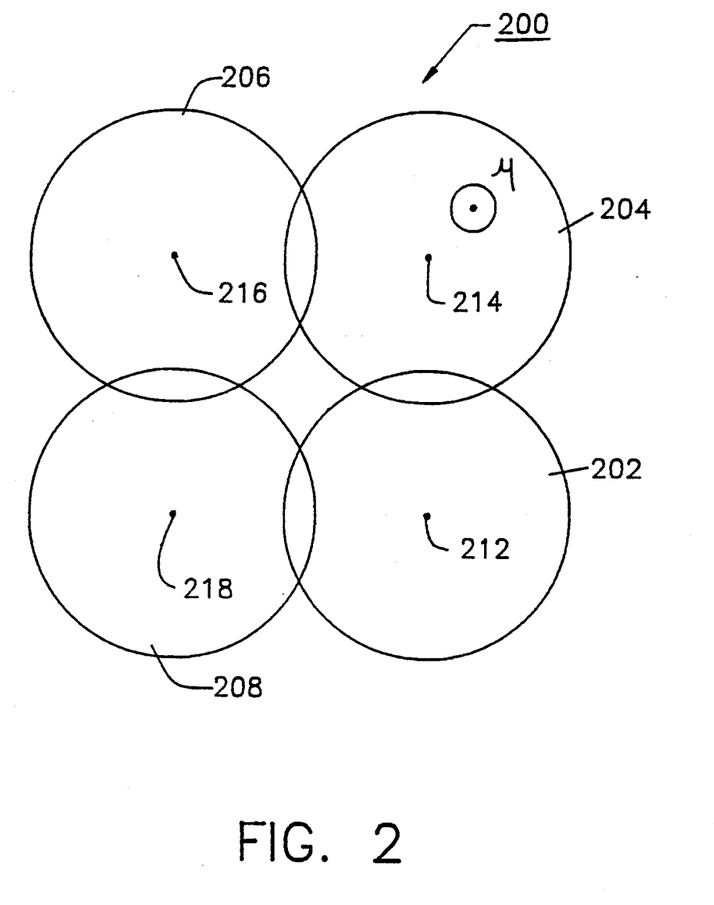
FIG. 2 is a schematic diagram depicting operation of another embodiment of the invention, and showing a second plurality of communications sites suited for cellular systems.

FIG. 2 is a schematic diagram depicting operation of another embodiment of the invention having a plurality of communications sites suited for cellular systems. In the illustrated cellular configuration, the geographic area of coverage 200 is divided into four communications cells 202, 204, 206, 208 which are each served by a central base communications station and corresponding antenna 212, 214, 216, 218. As in the system discussed in connection with FIG. 1, perfect geographic isolation does not exist between the various cells. In particular, areas of overlap exist between the communications cells 202, 204, 206, 208. In conventional cellular systems, interference in these areas of overlap has posed significant difficulty. In connection with the invention, however, interference in the regions of overlap is minimized in the manner described above with regard to FIG. 1. More specifically, the system provides sets of self orthogonal frequency hopping communications channels, wherein such sets are characterized by minimal cross correlation between channels of different sets. When implemented in a cellular configuration, as illustrated in FIG. 2, the FH-CDMA system described herein yields a one cell reuse pattern. These aspects are discussed in greater detail hereinafter.

Frequency Hopping Sequences

Figure 3A:
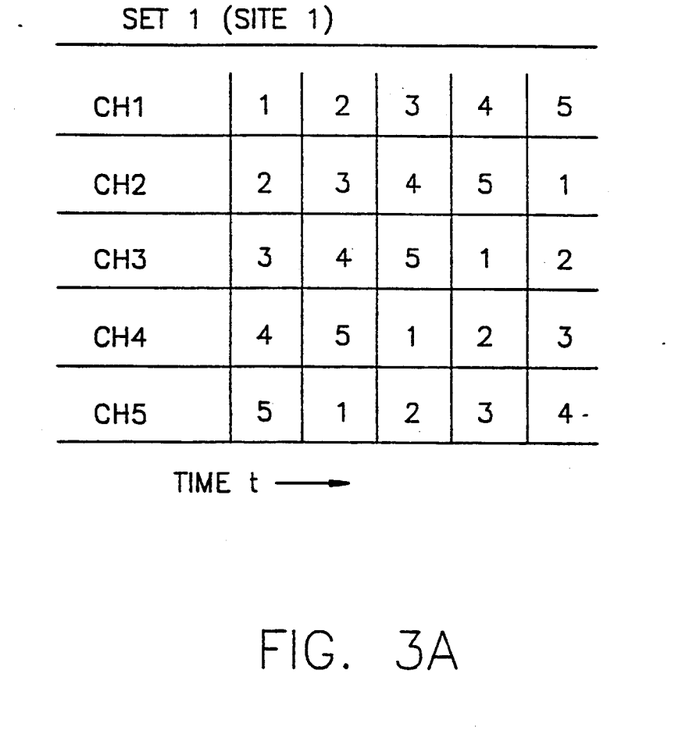
FIGS. 3A, 3B, 3C depict the construction of communications channels from sequences of frequencies in accordance with the invention.
Figure 3B:
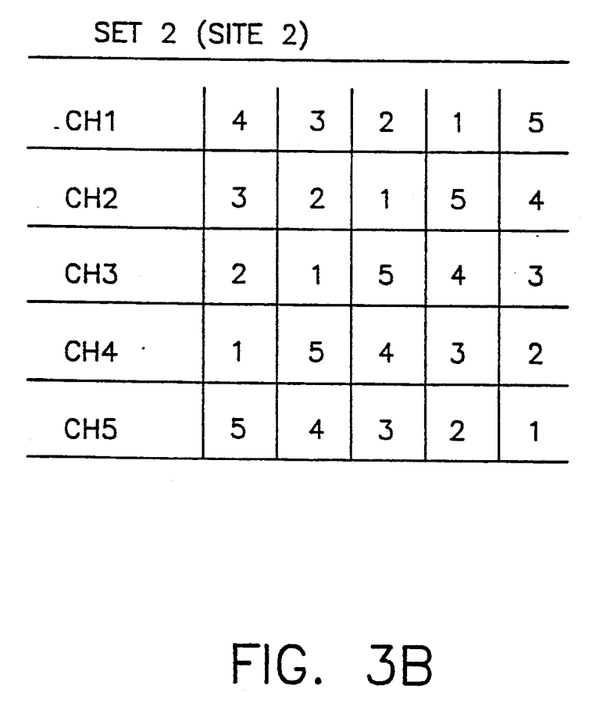
Figure 3C:
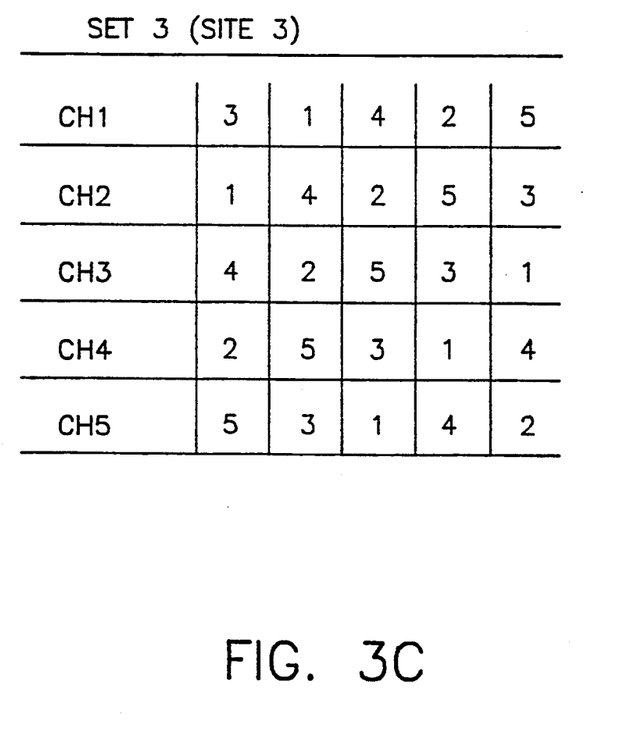

FIGS. 3A, 3B, 3C depict the construction of communications channels from sequences of carrier frequencies in accordance with the invention.

In particular, the minimally cross correlated frequency hopping communications channels described above are defined in accordance with the code division technique illustrated in FIGS. 3A, 3B, and 3C.

FIG. 3A is a chart relating each channel 1, 2, 3, 4, to a unique series of frequency-hopping sequences, thereby indicating the manner in which four orthogonal communications channels 1, 2, 3, 4 are defined from the set of N frequencies 1, 2, 3, 4, . . . , N. It should be noted that sequences 1, 2, 3, and 4 are identical to each other but are each shifted one time slot from each other, such that sequences 1, 2, 3, and 4 are mutually orthogonal.

As illustrated in FIGS. 3A, 3B, and 3C, multiple communication channels using the same carrier frequencies are attained by allocating the carrier frequencies to each communications channels at preselected times. A plurality of hopping sequences are used to assign the carrier frequencies to different channels during the time periods. These unique hopping sequences are selected so that they are orthogonal to one another in each site or sector, such that the cross-correlation between the hopping sequences for a given site or sector is zero.

Particular transmitted signals can be retrieved from the communications channel defined by such a hopping sequence by using the hopping sequence in the receiver.

Figure 6:
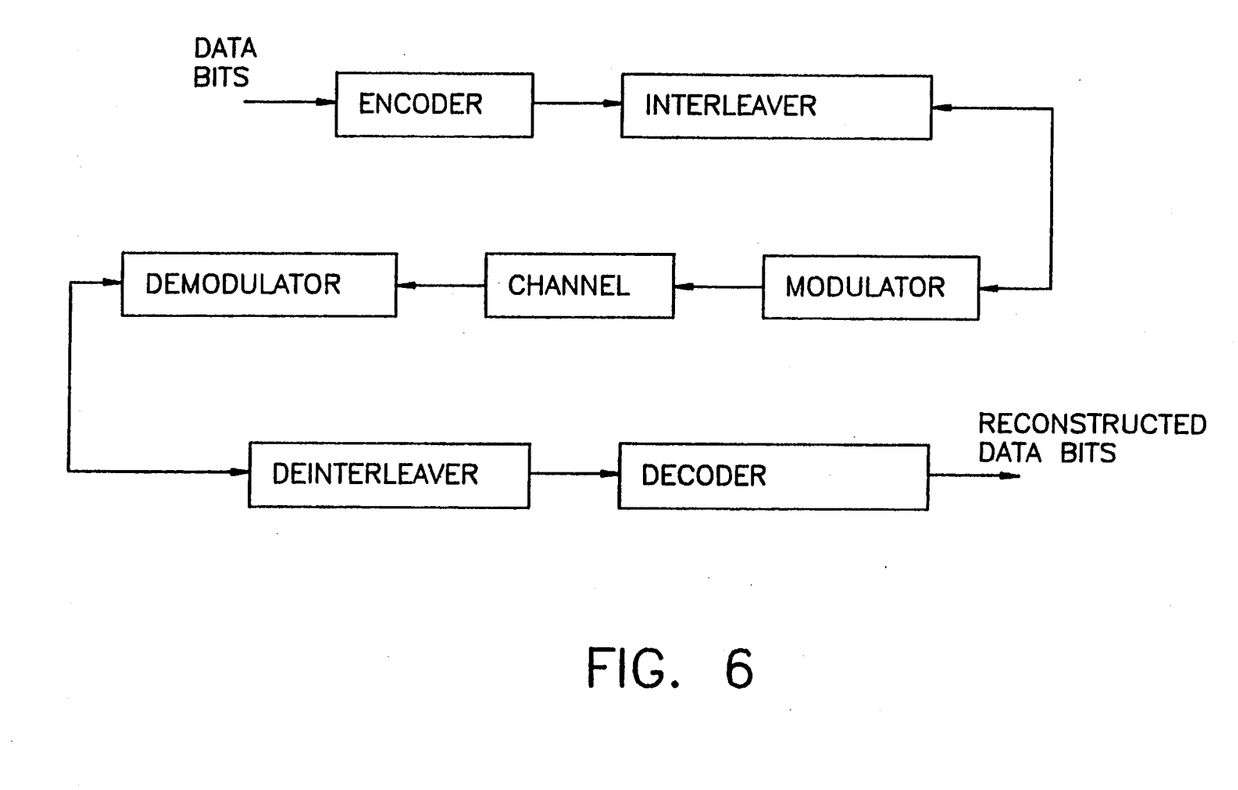
FIG. 6 is a block diagram depicting an encoding/decoding configuration in accordance with the invention.

The hopping sequences are selected such that users in each site are assigned mutually orthogonal sequences, and inter-site correlation of frequency-hopping sequences is theoretically zero. In the preferred embodiment of this invention there is only one time that any carrier frequency when associated with a sequence defining a particular channel in one site interferes with any particular channel in adjacent sites. Known Forward Error Correction (FEC) and interleaving techniques can be employed in the system described herein to mitigate remaining interference. A system architecture providing these features is illustrated in FIG. 6.

With proper selection of system parameters, the frequency-hopping code division multiple access (FH-CDMA) system described herein offers advantages previously asserted for direct sequence (DS-CDMA) systems. In addition, the user capacity of FH-CDMA is enhanced by the intrinsic interference averaging afforded by the system, and can readily exploit the intermittent duty cycle associated with voice activity. Moreover, due to the orthogonal operation described herein, interference from co-users of a user's site is eliminated. Since this is the major source of interference in non-orthogonal systems typical of DS-CDMA systems, FH-CDMA yields higher capacity and enhanced performance capabilities when structured as set forth above. When implemented in a cellular configuration, as illustrated in FIG. 2, the FH-CDMA system described herein also yields a one site or cell reuse pattern.

From an implementation standpoint, the FH-CDMA system described herein can be readily implemented with existing technologies. In particular, the mobile power control problem fundamental in DS-CDMA is much reduced in FH-CDMA. The one cell frequency reuse pattern alleviates the frequency management problem, which exists in current cellular systems.

Yet another aspect of this invention is that the second and third sets of the minimally cross correlated frequency hopping communications channels are decimated transformations of each of the minimally cross correlated frequency hopping communications channels in the first set.

Figure 4:
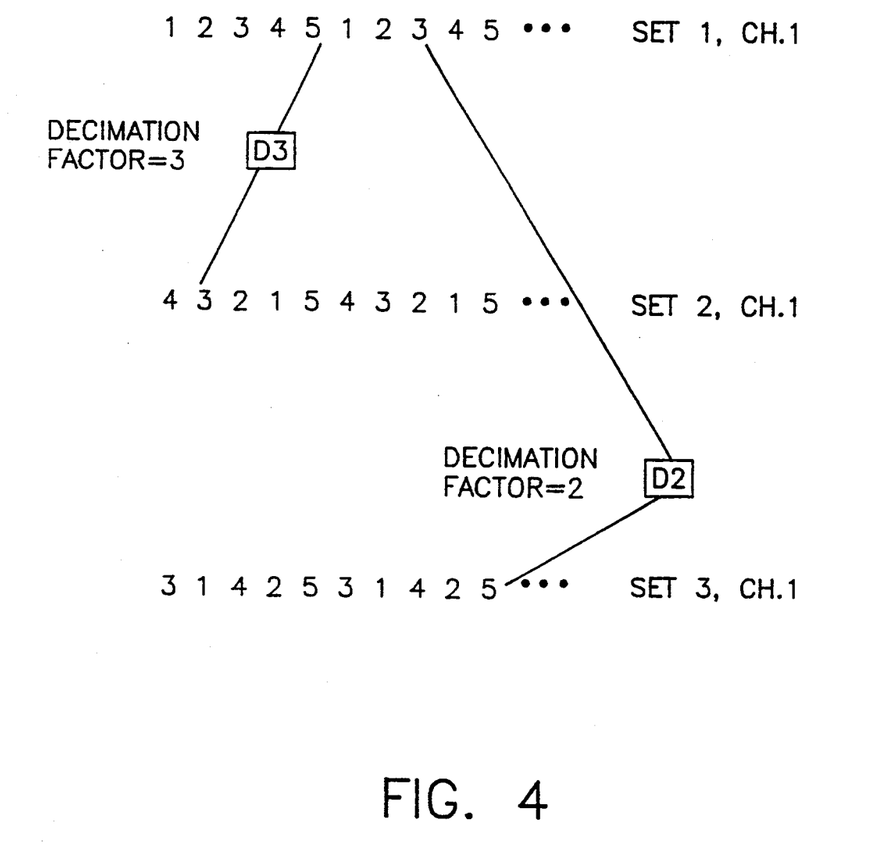
FIG. 4 depicts a decimation transform in accordance with the invention.

FIG. 4 depicts a decimation transform utilized in one practice of the invention. In accordance with the transform depicted in FIG. 4, each of the minimally cross correlated frequency hopping communications channels in the first set is defined by a unique sequence of the frequencies and the decimating transformation is performed on each of the minimally cross correlated frequency hopping communications channels in the first set by selecting frequencies from each of the minimally cross correlated frequency hopping communications channels in the first set in their sequential order, skipping a first decimation number of frequencies in the sequence, and repeating this process on the remaining frequencies in the sequence of each channel in their remaining order, until all of the frequencies in each channel are used to define a second set of minimally cross correlated frequency hopping communications channels.

A second decimating transformation is performed on each of the minimally cross correlated frequency hopping communications channels in the first set by selecting frequencies from each of the minimally cross correlated frequency hopping communications channels in the first set in their sequential order, skipping a second decimation number of frequencies in the sequence, and repeating this process on the remaining frequencies in the sequence of each channel in their remaining order, until all of the frequencies in each channel are used to define a third set of minimally cross correlated frequency hopping communications channels.

In accordance with the invention, the first and second decimation numbers are different and each is less than the minimum factor of N, where the minimum factor of a number is the smallest number, greater than one, that can be divided into the number with a remainder of zero.

For example, suppose that Channel 1 of a first set of orthogonal frequency hopping communications channels associated with a first communications site is defined by the following frequency hopping sequence:

$$1\ 2\ 3\ 4\ 5\ 1\ 2\ 3\ 4\ 5\ 1\ 2\ 3\ 4\ 5\ \ldots \qquad \text{(Set 1, Ch. 1)}$$

wherein the numbers 1, 2, 3, 4, and 5 represent discrete carrier frequencies. Decimation is executed on Channel 1 of the first set by selecting frequencies from the above-listed frequency hopping sequence in sequential order, skipping a first number of frequencies in the sequence. This number is referred to herein as the "decimation number" or "decimation factor." For purposes of this example, suppose a decimation factor of 3. Decimating the above sequence with a decimation factor of 3 yields the following frequency hopping sequence:

$$4\ 3\ 2\ 1\ 5\ 4\ 3\ 2\ 1\ 5\ 4\ 3\ 2\ 1\ 5\ \ldots \qquad \text{(Set 2, Ch. 1)}$$

In accordance with the invention, this sequence is used to define Channel 1 of the second set of channels, which is associated with a second communications site.

Frequency hopping sequences for the remaining channels of Set 2 are constructed similarly, by decimating the sequences for each of the channels of Set 1 by the same decimation factor of 3.

Then, to generate the frequency hopping sequence defining Channel 1 of the third set of channels—which is associated with the third communications site—the Set 1, Channel 1 sequence is decimated by a different decimation number, selecting frequencies from the Set 1, Channel 1 sequence in their sequential order, skipping the second decimation number of frequencies in the sequence. In particular, the following sequence can be decimated, for example, by the decimation factor of 2, such that the decimation of the sequence $$1\ 2\ 3\ 4\ 5\ 1\ 2\ 3\ 4\ 5\ 1\ 2\ 3\ 4\ 5\ \ldots \qquad \text{(Set 1, Ch. 1)}$$

yields $$3\ 1\ 4\ 2\ 5\ 3\ 1\ 4\ 2\ 5\ 3\ 1\ 4\ 2\ 5\ \ldots \qquad \text{(Set 3, Ch. 1)}$$

This process is repeated on the remaining frequencies in the sequence of each channel in their remaining order until all of the frequencies in each channel are used to define a third set of minimally cross correlated frequency hopping communications channels.

It will be appreciated that the above-described operations provide sets of sequences having minimum cross-correlation, and support communications sites or sectors in which no two of channels in a given site employ the same one of the allocated frequencies at the same time. The resulting system is thus characterized by orthogonal operation within a given site or sector, and minimum sector-to-sector cross-correlation.

This system has the property that the number of available adjacent communications sites is one less than the minimum factor of the number of assigned frequencies. The minimum factor of a number is the smallest number, greater than one, that can be divided into the number with a remainder of zero. Thus, if the number of assigned frequencies is three, then the minimum factor is three, and the maximum number of adjacent minimally cross correlated communications sites is two. If the number of assigned frequencies is four, then the minimum factor is two, and only one site can be serviced.

Similarly, if the number of frequencies utilized is 10, then only one site can be serviced. If the number of frequencies utilized is seven, then six sites can be serviced. Accordingly, the maximum number of sites can be serviced by a system of this invention, using a given number N of frequencies, if N is a prime number. Thus, in a preferred embodiment of this invention, the number N of frequencies is a prime number.

Interleaving and Forward Error Correction

The capacity of system described herein is determined by the average interference over the entire bandwidth. Such average interference is usually much smaller than the worst case interference, unless the interference is the same in all parts of the bandwidth. In a multiple-site embodiment of the invention, interference can occur in the form of collisions, i.e., simultaneous use of the same frequency at the same time, by users in the same communications site, or by users in a different communications site. System performance depends upon the probability of collisions, and the power of the colliding interferer.

Figure 5:
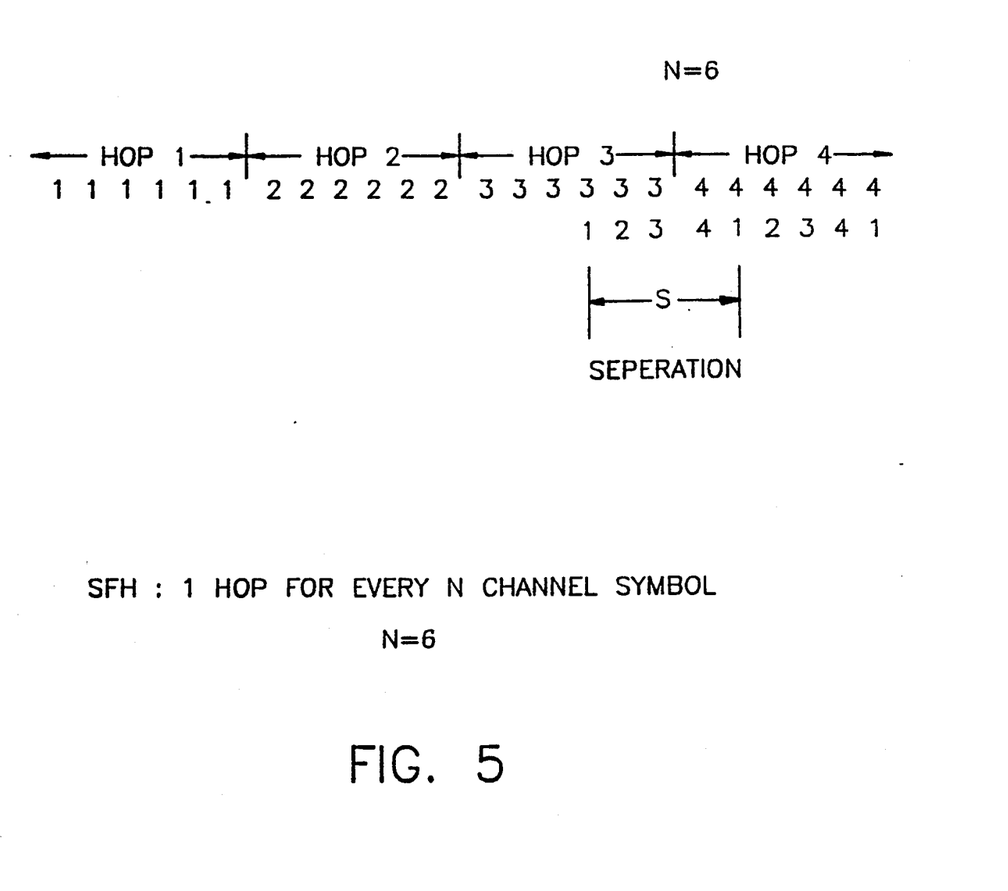
FIG. 5 depicts the temporal relationship between frequency hops and transmission of digital information in accordance with the invention.

In order to reduce the effects of such collisions, a mobile communications system in accordance with the invention encodes and interleaves digital information signals on the minimally cross correlated frequency hopping communications channels such that several information-representative digital channel symbols are transmitted during each hop. As depicted in FIG. 5, in accordance with the slow frequency hopping scheme employed by the invention, one hop occurs for every M channel symbols, where, for example, M=6.

Accordingly, as indicated in FIG. 5, corrupted bits from an interfered hop are separated by a number of channel symbols S. This redundancy enables the utilization of known digital error correction techniques, such as Forward Error Correction (FEC), which detects errors due to collisions, rejecting selected ones of the redundant bits as INVALID, and accepting others as VALID. In accordance with the invention, at least two techniques can be implemented to determine which ones of the redundant bits are to be accepted as VALID.

Under the first technique, a complex measure of each sampled value of the received signal is projected on a decision chart and is assigned a value (metric) that corresponds to the decision regions of such chart that include the sampled value. The metric is fed to a conventional FEC decoder for soft error correction and decision. An example of a configuration utilizing an FEC decoder is depicted in FIG. 6.

Under the second technique, a carrier/interference (C/I) ratio is estimated for each hop. This estimate is fed to the FEC decoder to improve its performance. This technique can be implemented by detecting each hop whose C/I ratio is below a predetermined threshold, and for each such hop, replacing the metric corresponding to such hop with a null metric that does not affect the decision process of the FEC decoder.

Soft Decoding/Side Information

In the embodiment depicted in FIG. 6, system performance is further enhanced by implementing in the decoder the known techniques of soft decision making and the use of side information.

Voice Activity Detection

In a preferred embodiment of the invention, system performance is also improved by employing Voice Activity Detection (VAD), which increases system capacity by reducing the average interference level by the duty ratio of the speech.

Figures 7, 8:
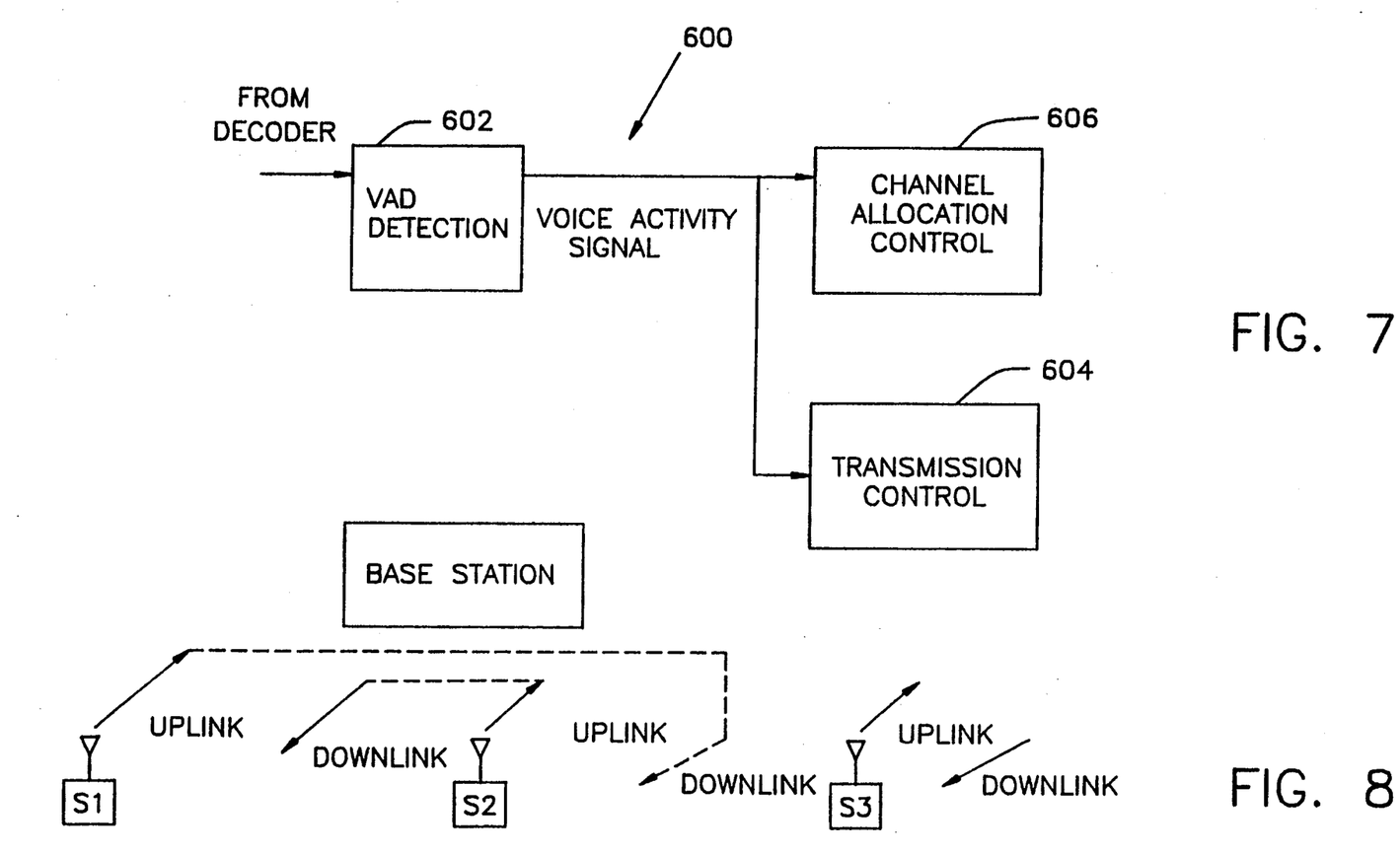
FIG. 7 is a block diagram depicting the structure of a voice activity detection circuit in accordance with the invention.
FIG. 8 is a block diagram depicting duplex operation in accordance with the invention.

FIG. 7 is a block diagram depicting the structure of a voice activity detection circuit in accordance with the invention. The circuit 600 includes a voice activity detection module 602, a transmission control module 604 and a channel allocation control module 606. The voice activity detection module 602 measures signal activity levels representative of subscriber voice activity on an assigned channel to generate a channel voice activity signal. A preferred embodiment of the invention includes elements responsive to the voice activity signal for selectively allocating channels to subscribers. A voice activity signal indicative of silence is used in a decision making program to deactivate the channel in question through the transmission control module 604. A second program reallocates a channel to the subscriber upon resumption of voice activity through the channel allocation module 606.

Micro-Sites/Duplex Operation

A preferred embodiment of the invention provides apparatus for defining at least a first micro-site within one or more of the adjacent communications sites, as depicted in FIG. 1. Each micro-site reuses the same N frequencies as are used by the adjacent communications sites. The micro-site is characterized, for example, by an average power of less than or equal to 10% the average power as the adjacent communications site in which it is situated. This power ratio is provided by way of example only, and other micro-site power levels may be employed in connection with the invention. A micro-site is utilized for high usage areas, or areas in electromagnetic shadows, or to extend a communications sector or site.

Under current governmental regulations, two sets of frequencies are assigned by the FCC for SMR services. One set is utilized for uplink transmission from mobiles to the base station, while the other is dedicated to downlink transmission from the base station to mobile units. A fixed gap, for example, 39 MHz or 45 MHz is maintained between these two sets, and channels are assigned in pairs, one for downlink and one for uplink.

The present invention utilizes appropriate allocation of downlink and uplink channels to provide the option of direct communication between subscribers who are in the same micro-site. Such communication is referred to as duplex operation.

FIG. 8 is a block diagram depicting duplex operation in accordance with the invention. As illustrated in FIG. 8, the subscribers can be directly linked by allocation of uplink and downlink channels. In particular, duplex operation is implemented by causing one of the two subscribers to communicate uplink with a first downlink channel and downlink with a first uplink channel, and causing the other of the two subscribers to communicate uplink on the first uplink channel and downlink on the first downlink channel.

Thus, in accordance with the invention, the capability of full duplex operation is provided so that two subscribers can communicate directly to each other without going through the base station, by having one subscriber assigned the same-uplink channel as the other subscriber with whom direct communication is to be achieved has for its downlink channel and vice versa. Similarly, the configuration depicted in FIG. 8 provides the capability for performing a conference call between multiple subscribers within a given communications site by causing each of said subscribers to employ the same channel.

Flexible Sector/Site Boundaries

Figure 9:
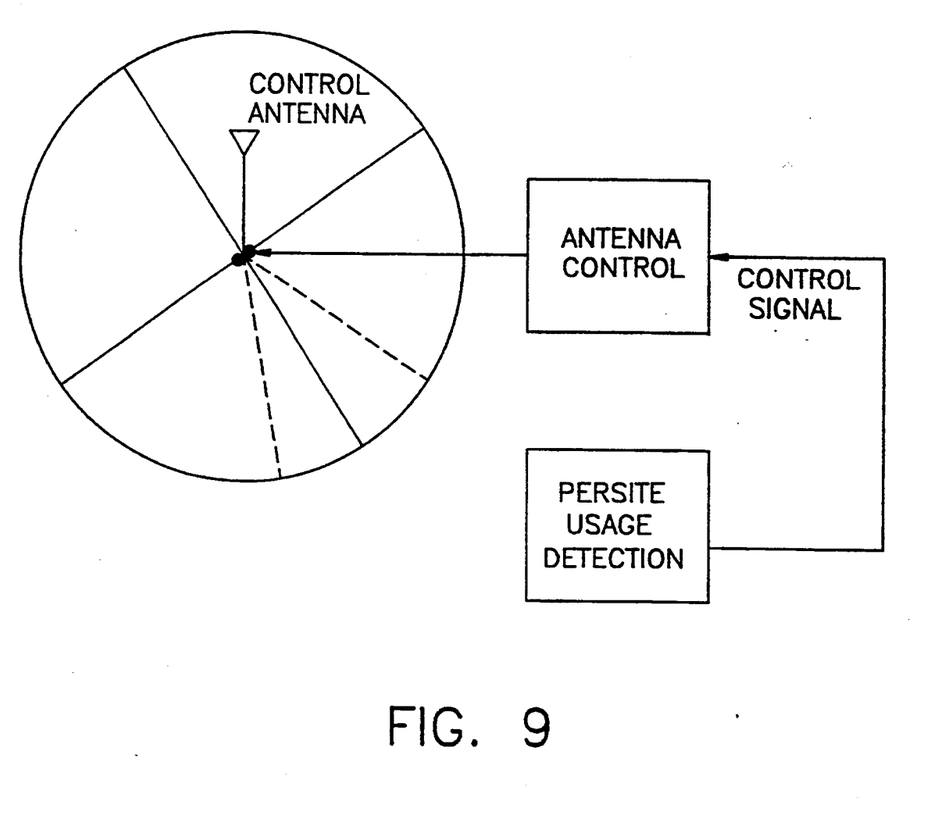
FIG. 9 is a block diagram depicting an embodiment of the invention utilizing an electronic antenna and boundary control apparatus.

As indicated by dashed lines in FIG. 1, the boundaries of the communications sites are flexible. In this regard, a preferred embodiment of the invention, depicted in FIG. 9, employs an electronically controlled antenna, apparatus responsive to a control signal for controlling the antenna to provide a first antenna radiation pattern for defining the first of the adjacent communications sites, apparatus responsive to a control signal for controlling the antenna to provide a second antenna radiation pattern which overlaps with the first antenna radiation pattern at a boundary for defining the second of the adjacent communications sites; and apparatus responsive to the number of system subscribers using each of the first and second of adjacent communications sites for causing the control signal to move the boundary.

Multiple Antennas

Referring again to FIG. 2, the cellular system depicted therein utilizes four antennas having respective antenna radiation patterns for defining first, second, third and fourth adjacent communications sites. A fifth antenna utilized in the system has a respective fifth antenna radiation pattern for defining a micro-site within the first communications site. The micro-site reuses the same N frequencies utilized by the plurality of adjacent communications sites, while the radiation pattern of the fifth antenna defining the micro-site may be characterized, for example, by a mean power of no more than ten percent that of the other antenna radiation patterns. The ten percent power level is provided by way of example only, and other power levels may be utilized to define a micro-site.

It will thus be seen that the invention efficiently attains the objects set forth above, among those made apparent from the preceding description. In particular, the invention provides a mobile communications system in which the number of usable communications channels exceeds the number of allocated carrier frequencies. The FH-CDMA system described herein provides a capacity that is superior to all known cellular systems.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a frequency hopping multiple access communications system in which a set of N carrier frequencies are used to provide frequency hopping communications channels in said system, said system including:

means for defining a plurality of adjacent communications sites associated with said communications system;

means using said N carrier frequencies for defining a first set of frequency hopping communications channels associated with a first of said plurality of adjacent communications sites in which no two of said channels in said first set of frequency hopping communications channels employ the same one of said N carrier frequencies at the same time;

means using said N carrier frequencies for defining a second set of frequency hopping communications channels associated with a second of said plurality of adjacent communications sites in which no two of said channels in said second set of frequency hopping communications channels employ the same one of said N carrier frequencies at the same time;

said second set of channels is further defined so that no one of said channels in said second set of frequency hopping communications channels employ the same one of said N carrier frequencies at the same time as more than a predetermined number of said channels in said first set of frequency hopping communications channels; where said predetermined number is the minimum number of channels possible;

means for selectively encoding digital information signals on ones of said frequency hopping communications channels such that there is a redundant relationship between channel bits;

error correcting means for setting said relationship; and decoder means for utilizing said relationship for error correction.

2. In the frequency hopping multiple access communications system as defined in claim 1 also including decoding means for decoding said digital information signals which includes the use of soft decision making and side information.

3. In a frequency hopping multiple access communications system in which a set of N carrier frequencies are used to provide frequency hopping communications channels in said system, said system including:

means for defining a plurality of adjacent communications sites associated with said communications system;

means using said N carrier frequencies for defining a first set of frequency hopping communications channels associated with a first of said plurality of adjacent communications sites in which no two of said channels in said first set of frequency hopping communications channels employ the same one of said N carrier frequencies at the same time;

means using said N carrier frequencies for defining a second set of frequency hopping communications channels associated with a second of said plurality of adjacent communications sites in which no two of said channels in said second set of frequency hopping communications channels employ the same one of said N carrier frequencies at the same time;

said second set of channels is further defined so that no one of said channels in said second set of frequency hopping communications channels employ the same one of said N carrier frequencies at the same time as more than a predetermined number of said channels in said first set of frequency hopping communications channels; where said predetermined number is the minimum number of channels possible;

voice activity detection means for measuring signal activity levels representative of subscriber voice activity on an assigned channel to generate a channel voice activity signal; and means responsive to said channel voice activity signal for selectively allocating channels to subscribers.

4. In the frequency hopping multiple access communications system as defined in claim 1, 2, 3 in which said second set of frequency hopping communications channels is further defined as a first decimated transformation of each of said frequency hopping communications channels in said first set.

5. In a frequency hopping multiple access communications system in which a set of N carrier frequencies are used to provide frequency hopping communications channels in said system, said system including:

means for defining a plurality of adjacent communications sites associated with said communications system;

means using said N carrier frequencies for defining a first set of frequency hopping communications channels associated with a first of said plurality of adjacent communications sites in which no two of said channels in said first set of frequency hopping communications channels employ the same one of said N carrier frequencies at the same time; and means using said N carrier frequencies for defining a second set of frequency hopping communications channels associated with a second of said plurality of adjacent communications sites in which no two of said channels in said second set of frequency hopping communications channels employ the same one of said N carrier frequencies at the same time; wherein said second set of frequency hopping communications channels is further defined as a first decimated transformation of said frequency hopping communications channels in said first set.

6. In the frequency hopping multiple access communications system as defined in claim 5 in which:

said second set of channels is further defined so that no one of said channels in said second set of frequency hopping communications channels employ the same one of said N carrier frequencies at the same time as more than a predetermined number of said channels in said first set of frequency hopping communications channels;

where said predetermined number is the minimum number of channels possible.

7. In the frequency hopping multiple access communications system as defined in claim 6 in which the predetermined number is one.

8. In the frequency hopping multiple access communications system as defined in claim 5 further including:

means using said N carrier frequencies for defining a third set of frequency hopping communications channels associated with a third of said plurality of adjacent communications sites in which no two of said channels in said third set of frequency hopping communications channels employ the same one of said N carrier frequencies at the same time.

9. In the frequency hopping multiple access communications system as defined in claim 8 in which said second set of frequency hopping communications channels is further defined as a first decimated transformation of each of said frequency hopping communications channels in said first set; and said third set of frequency hopping communications channels is further defined as a second decimated transformation of each of said frequency hopping communications channels in said first set.

10. The multiple access communications system as defined in claim 9 in which:

each of said frequency hopping communications channels in said first set is defined by a unique sequence of said N frequencies and said first decimating transformation relates said first set of frequency hopping communications channels to said second set of frequency hopping communications channels as though frequencies from each of said frequency hopping communications channels in said first set were selected in their sequential order skipping a first decimation number of frequencies in said sequence and repeating this process on the remaining of said N frequencies in said sequence of each channel in their remaining order until all of the N frequencies in each channel are used to define said second set of frequency hopping communications channels; and said second decimating transformation relates said first set of frequency hopping communications channels to said third set of frequency hopping communications channels as though frequencies from each of said frequency hopping communications channels in said first set were selected in their sequential order skipping a second decimation number of frequencies in said sequence and repeating this process on the remaining of said N frequencies in said sequence of each channel in their remaining order until all of the N frequencies in each channel are used to define said third set of frequency hopping communications channels wherein said first and second decimation numbers are different and each is less than the minimum factor of N.

11. The multiple access communications system as defined in claim 5, said system further comprising;

means for performing a conference call between a plurality of subscribers in a site by causing each of said subscribers to employ the same channel.

12. In a method of providing a frequency hopping multiple access communications system in which a set of N carrier frequencies are used to provide frequency hopping communications channels in said system, said method including:

defining a plurality of adjacent communications sites associated with said communications system;

using said N carrier frequencies for defining a first set of frequency hopping communications channels associated with a first of said plurality of adjacent communications sites in which no two of said channels in said first set of frequency hopping communications channels employ the same one of said N carrier frequencies at the same time; and using said N carrier frequencies for defining a second set of frequency hopping communications channels associated with a second of said plurality of adjacent communications sites in which no two of said channels in said second set of frequency hopping communications channels employ the same one of said N carrier frequencies at the same time, wherein said second set of frequency hopping communications channels is a first decimated transformation of each of said frequency hopping communications channels in said first set.

13. In the method of providing a frequency hopping multiple access communications system as defined in claim 12 in which:

each of said frequency hopping communications channels in said first set is defined by a unique sequence of said N frequencies and said first decimating transformation relates said first set of frequency hopping communications channels to said second set of frequency hopping communications channels as though frequencies from each of said frequency hopping communications channels in said first set were selected in their sequential order skipping a first decimation number of frequencies in said sequence and repeating this process on the remaining of said N frequencies in said sequence of each channel in their remaining order until all of the N frequencies in each channel are used to define said second set of frequency hopping communications channels; and said second decimating transformation relates said first set of frequency hopping communications channels to said third set of frequency hopping communications channels as though frequencies from each of said frequency hopping communications channels in said first set were selected in their sequential order skipping a second decimation number of frequencies in said sequence and repeating this process on the remaining of said N frequencies in said sequence of each channel in their remaining order until all of the N frequencies in each channel are used to define said third set of frequency hopping communications channels wherein said first and second decimation numbers are different and each is less than the minimum factor of N.

14. In a frequency hopping multiple access communications system in which a set of N carrier frequencies are used to provide frequency hopping communications channels in said system, said system including:

a plurality of adjacent communications sites associated with said communications system; and a central base communications station which uses said N carrier frequencies for defining a first set of frequency hopping communications channels associated with a first of said plurality of adjacent communications sites in which no two of said channels in said first set of frequency hopping communications channels employ the same one of said N carrier frequencies at the same time; and which also uses said N carrier frequencies for defining a second set of frequency hopping communications channels associated with a second of said plurality of adjacent communications sites in which no two of said channels in said second set of frequency hopping communications channels employ the same one of said N carrier frequencies at the same time, wherein said second set of frequency hopping communications channels is further defined as a first decimated transformation of each of said frequency hopping communications channels in said first set.

15. In the frequency hopping multiple access communications system as defined in claim 14 in which said second set of frequency hopping communications channels is further defined as a first decimated transformation of each of said frequency hopping communications channels in said first set:

in which each of said frequency hopping communications channels in said first set is defined by a unique sequence of said N frequencies and said first decimating transformation relates said first set of frequency hopping communications channels to said second set of frequency hopping communications channels as though frequencies from each of said frequency hopping communications channels in said first set were selected in their sequential order skipping a first decimation number of frequencies in said sequence and repeating this process on the remaining of said N frequencies in said sequence of each channel in their remaining order until all of the N frequencies in each channel are used to define said second set of frequency hopping communications channels.

* * * * *